(12) United States Patent
Kane et al.

(10) Patent No.: US 11,755,001 B2
(45) Date of Patent: Sep. 12, 2023

(54) MODULAR SYSTEMS FOR INDUSTRIAL MACHINERY

(71) Applicant: Ford Global Technologies, LLC, Dearborn, MI (US)

(72) Inventors: Paul Michael Kane, Rayleigh (GB); Leigh Canham, Southend-on-Sea (GB); Leslie Lee, Horndon on the Hill (GB)

(73) Assignee: Ford Global Technologies, LLC, Dearborn, MI (US)

( * ) Notice: Subject to any disclaimer, the term of this patent is extended or adjusted under 35 U.S.C. 154(b) by 200 days.

(21) Appl. No.: 17/323,207

(22) Filed: May 18, 2021

(65) Prior Publication Data

US 2022/0374000 A1 Nov. 24, 2022

(51) Int. Cl.
*G05B 19/418* (2006.01)
*G07C 5/00* (2006.01)

(52) U.S. Cl.
CPC ..... *G05B 19/4184* (2013.01); *G05B 19/4183* (2013.01); *G05B 19/41895* (2013.01); *G07C 5/008* (2013.01)

(58) Field of Classification Search
USPC ........................................................ 700/82
See application file for complete search history.

(56) References Cited

U.S. PATENT DOCUMENTS

| | | | |
|---|---|---|---|
| 6,018,537 A | 1/2000 | Hofmann et al. | |
| 9,908,239 B1* | 3/2018 | O'Brien | B25J 9/02 |
| 10,131,388 B2 | 11/2018 | Kilibarda | |
| 10,579,070 B1* | 3/2020 | Konrardy | B60L 53/36 |
| 2005/0267632 A1* | 12/2005 | Waita | G06T 7/001 |
| | | | 700/245 |
| 2008/0178537 A1 | 7/2008 | Spangler et al. | |
| 2017/0115657 A1* | 4/2017 | Trussell | H01L 21/6719 |
| 2018/0294245 A1* | 10/2018 | Kim | B23K 3/02 |
| 2018/0345777 A1* | 12/2018 | Birnschein | B60W 10/22 |
| 2019/0188635 A1* | 6/2019 | High | G08G 1/205 |
| 2019/0392569 A1* | 12/2019 | Finch | G06T 19/20 |

FOREIGN PATENT DOCUMENTS

| | | | |
|---|---|---|---|
| CN | 109927682 A | * | 6/2019 |
| KR | 20090071882 | | 7/2009 |
| WO | WO2019202569 | | 10/2019 |

* cited by examiner

*Primary Examiner* — Hien D Khuu
(74) *Attorney, Agent, or Firm* — Haley Guiliano LLP

(57) ABSTRACT

Systems and methods are described for autonomously recovering a machine comprising one or more modules. An error message from the machine is received and, based on the error message, a first module of the one or more modules to replace is determined, wherein the first module has a first type. An autonomous vehicle is instructed to remove, from the machine, the first module. The autonomous vehicle is instructed to install, at the machine, a second module of the first type.

18 Claims, 9 Drawing Sheets

Fig. 1
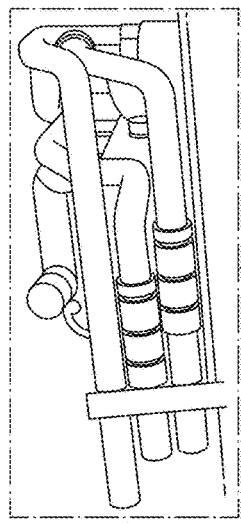
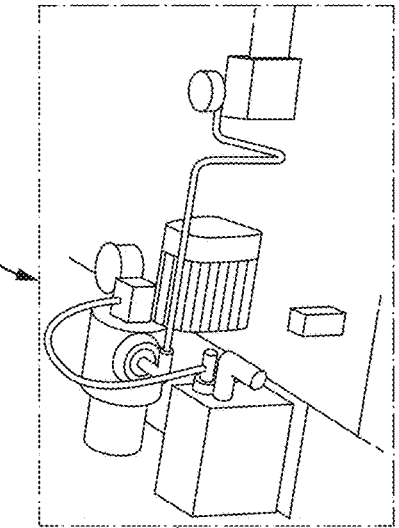
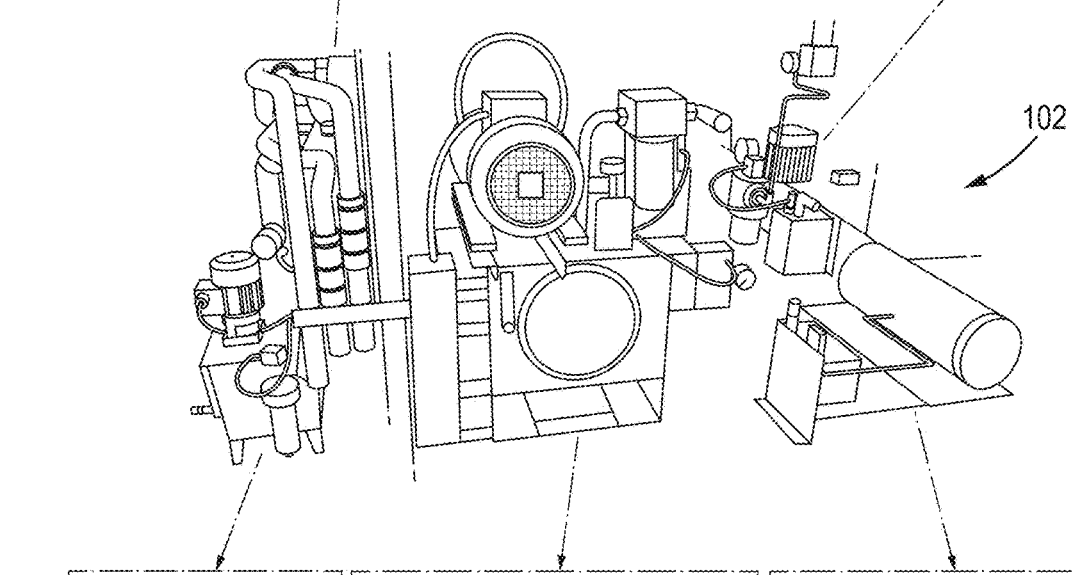
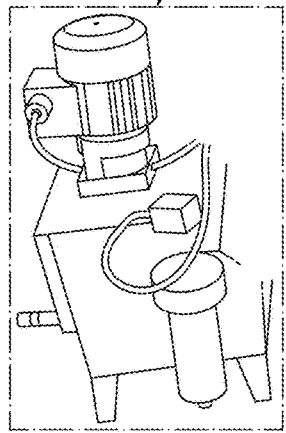
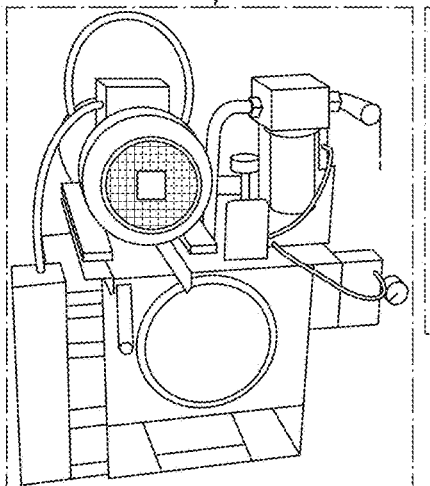
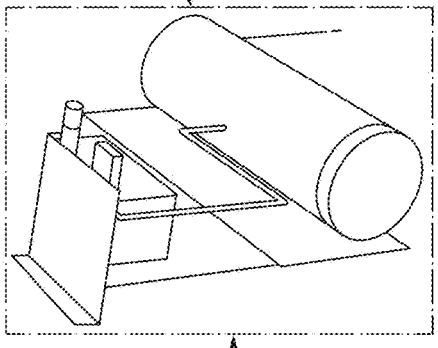

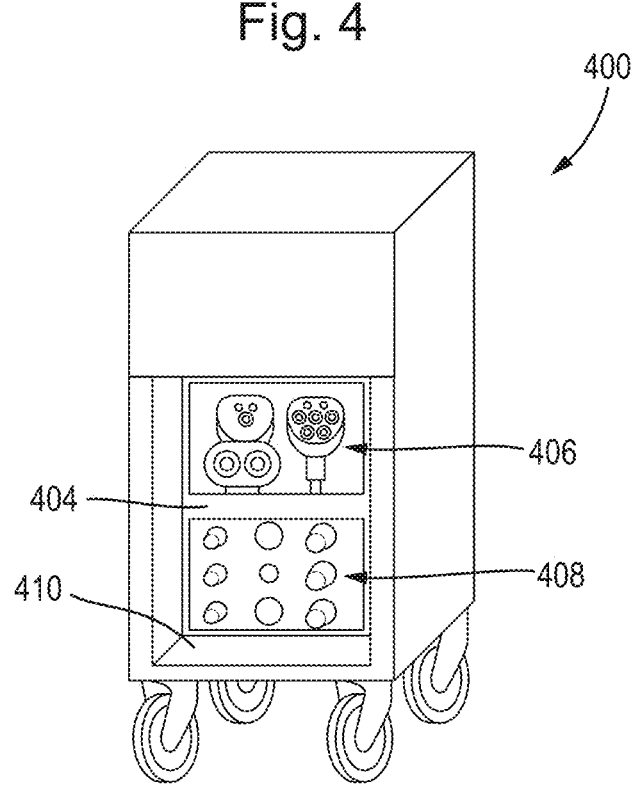

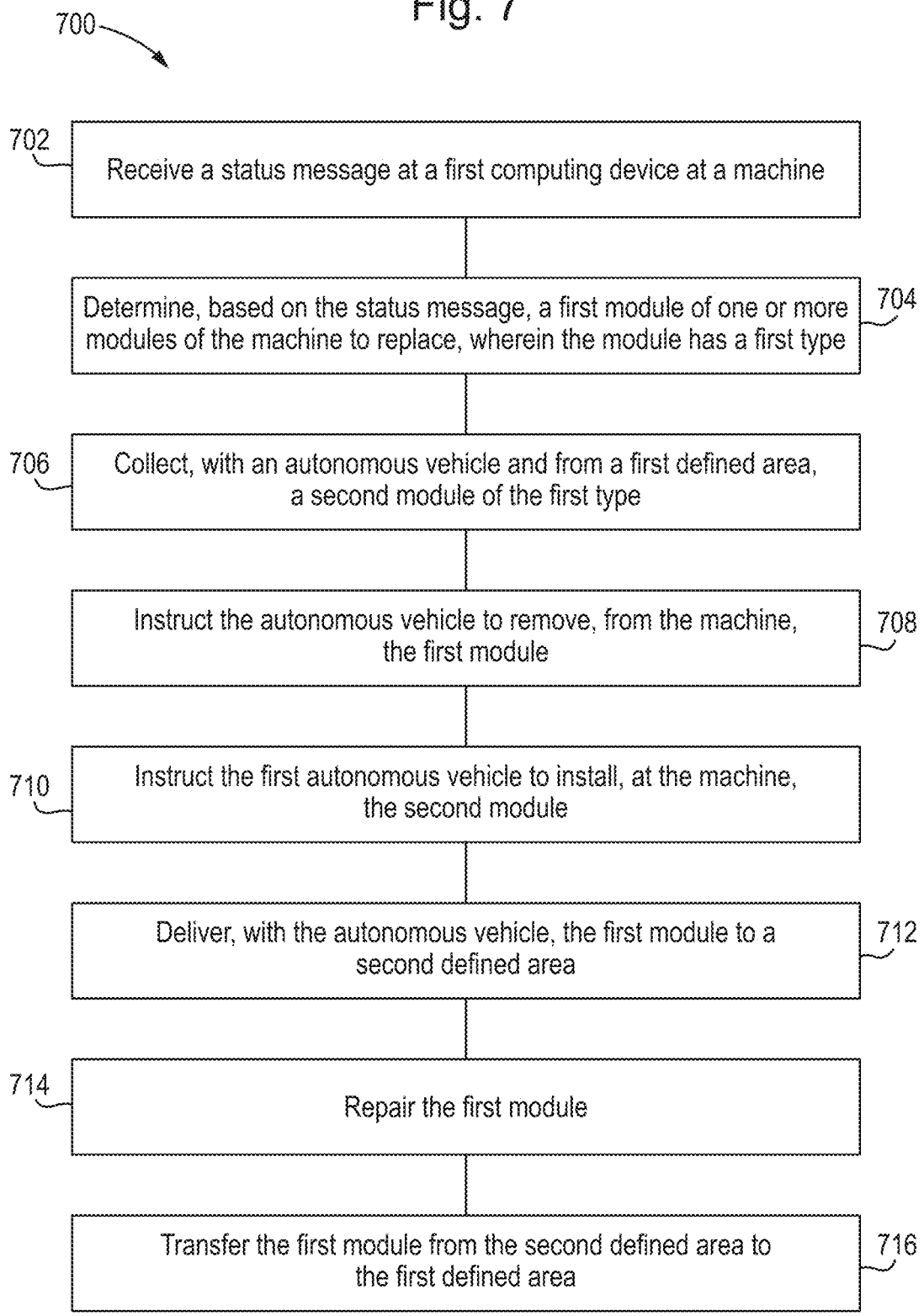

MODULAR SYSTEMS FOR INDUSTRIAL MACHINERY

BACKGROUND

The present disclosure relates to modular systems for machinery. More particularly, but not exclusively, the present disclosure relates to removing, and installing, modules of a machine with an autonomous vehicle.

SUMMARY

In a factory, such as a car manufacturing factory, there are numerous industrial machines. These industrial machines have support systems that, for example, control fluid, transfer energy and/or provide motive force. However, when a failure of one of these support systems occurs, an entire industrial machine can go offline causing delays in manufacturing output. Additionally, if, for example, the industrial machine is part of a critical process, or a bottleneck operation, significant delays in factory output can quickly occur.

One solution is to proactively replace system components before they break; however, this also leads to downtime and can lead to wastage if system components are replaced before the end of their useful life. In addition, unexpected failures are still likely to occur, so this will not mitigate the problem entirely.

Systems and methods are provided herein for autonomously recovering, e.g., retuning to a state of normal operation, a machine comprising one or more modules.

According to some examples of the systems and methods provided herein, a method of autonomously recovering a machine comprising one or more modules, comprises receiving a status message at a first computing device at the machine. Based on the status message, a first module of the one or more modules to replace is determined, wherein the first module has a first type. A first autonomous vehicle is instructed to remove, from the machine, the first module. The first autonomous vehicle is instructed to install, at the machine, a second module of the first type. Recovering a machine includes any action that at least partially addresses and/or improves a machine condition. Recovering can include changing a status of a machine from shutdown mode to limited operating mode and/or to a full operating mode. In an example, an industrial machine in a factory building may have a number of, e.g., several, support modules, that enable it to run. For example, a first support module may provide cooling to the industrial machine, a second support module may provide lubrication to the industrial machine, a third support module may provide hydraulics to the industrial machine, a fourth support module may provide pneumatics to the industrial machine, a fifth support module may provide an electrical system to the industrial machine, a sixth support module may provide a mechanical system to the industrial machine, a seventh support module may provide a laser system to an industrial machine and/or an eighth module may provide an ultrasonic welding system to an industrial machine. A machine may comprise any number of support modules and the support modules may be of any suitable type. In addition, a machine may comprise more than one support module of a single type. Support modules of the same type may be interchangeable and/or they may comprise sub-types of support module that are not interchangeable. In this example, a programmable logic controller (PLC) at the industrial machine monitors an array of sensors, which receive data from various components in the support modules. This enables the PLC to determine if there are any faults with the monitored components. If, for example, a compressor fails at the first support module, a compressor sensor may transmit a value representing the change in the voltage drawn by the compressor to the PLC. In this example, the PLC identifies a fault code (or error code) associated with the change in voltage and based on the fault code, identifies whether any action needs to be taken at the industrial machine and identifies one or more instructions to transmit to an autonomous vehicle. A status message is any data that indicates a status of a module. For example, it may include and error message and/or a servicing message. For example, an error message may include both a signal from a sensor and/or an identified fault code. A servicing message may be generated in accordance to a schedule and/or in response to, for example, an identified low fluid level and/or a filter change. In this example, the PLC generates instructions to shut down the industrial machine to avoid the industrial machine overheating and the PLC transmits instructions to an autonomous vehicle requesting that the first support module, which provides cooling, is replaced. The error message may comprise a failure code with a defined prefix, which is used to identify a failed system module. On identification of such an error message, the PLC may transmit a message to an autonomous vehicle. On receipt of the instructions, in this example, the autonomous vehicle follows a pre-defined route and collects a second support module of the same type (i.e., one that provides cooling) from a first defined area (or zone). The autonomous vehicle continues to follow a pre-defined route to the industrial machine and removes the first support module, that is currently installed at the machine. Once the first support module is removed, the autonomous vehicle installs the second support module at the industrial machine. On installation of the second support module, the PLC may run a diagnostic test to determine whether the second support module has been installed correctly and, on determining that the second support module has been installed correctly, the PLC may generate instructions to start the industrial machine. In some examples, the support modules may be hot swappable, in that the industrial machine may not need to be turned off in order to remove and install a replacement support module. An advantage of the systems and methods as defined herein is that downtime of a machine is limited to the time it takes to replace the module. Any time troubleshooting, fixing, and/or sourcing spare parts does not impact the time the machine is shutdown, as the replacement module enables the machine to resume operation whilst the failed/serviced module is attended to.

In some examples, the first autonomous vehicle collects the second module from a first defined area before removing the first module. The first autonomous vehicle may deliver the first module to another defined area, such as a second defined area. In further examples, the first module is repaired at the second defined area and is subsequently delivered to the first defined area. Continuing the above example, replacement support modules are stored in the first defined area. When the autonomous vehicle removes a faulty (and/or broken) support module from an industrial machine, it may follow a pre-defined route to a second defined area that is different from the first defined area. The autonomous vehicle may deposit the support module at the second defined area and may continue to follow a pre-defined route to a third defined area in which one or more autonomous vehicles are stored when not in use. At the second defined area, faulty support modules may be fixed. This may be by, for example, human technicians. In other examples, repairs may be carried out autonomously and/or semi-autonomously. For example, if a fault is caused by a low fluid level, this may be a fault that can be addressed autonomously. Once the faulty support module is fixed (or the fault is addressed) then the support module may be moved to the first defined area, so that it can be installed in another industrial machined. The support module may be moved from the second defined area to the first defined area by an autonomous vehicle that is not engaged in another task and/or when there are more than a threshold number of autonomous vehicles in the third defined area.

In some examples, all the modules within a factory (e.g., all of the modules of an industrial machine and/or a plurality of industrial machines within the same building), may utilize a standard size and/or frame. The modules may comprise one or more wheels. In other examples, the modules may be fully supported by the autonomous vehicle. The modules may comprise one or more quick release couplings. A quick release coupling may comprise a male connector and a female connector. The quick release couplings may be used for electrical and/or fluid connections. In some examples, all fluid connectors are located beneath any electrical connectors, when the module is in use. The modules may also comprise a drip tray. Each module may have an identifier, which the autonomous vehicle may use to identify a module to collect from, for example, the first defined area. The identifier may comprise a Quick Response (QR) code, an RFID (radio frequency identification) tag, a barcode and/or machine-readable text. The autonomous vehicle may comprise a corresponding component in order to read the identifier, for example a camera, an RFID reader and/or a barcode reader. In some examples, the modules also comprise a memory, such as a hard drive, for storing fault diagnostic codes. During repair and/or a service of the module, the fault diagnostic codes can be read to assist with repair and/or the service of the module.

A factory may comprise more than one industrial machine and the support modules may be interchangeable between the industrial machines. For example, a cooling support module may be used by more than one industrial machine. In other examples, support modules may be unique to an industrial machine. The aforementioned identifier may comprise additional information that indicates whether a support module is unique to a specific industrial machine (or group of industrial machines) and/or whether it may be used on any industrial machine in, for example, a factory.

In some examples, the first computing device communicates the error message to a plurality of autonomous vehicles and the plurality of autonomous vehicles communicate in a peer-to-peer manner to identify one of the plurality of autonomous vehicles as the first autonomous vehicle. For autonomous vehicles that communicate in a peer-to-peer manner, a swarm algorithm may be utilized, such that a central computing unit for issuing directions is not required. In other examples, the first computing device transmits the error message to a second computing device the second computing device identifies one of a plurality of autonomous vehicles as the first autonomous vehicle and the second computing device transmits the instructions to the first autonomous vehicle that cause the first autonomous vehicle to remove the first module and install the second module.

In some examples, the machine is an electric car and the first module is a battery. The error message may comprise that the battery is low on power (i.e. that it needs charging) and the autonomous vehicle may remove a battery from the car and replace it with another battery.

In some examples, the autonomous vehicle comprises a wireless transceiver and a memory for storing computer readable instructions. The autonomous vehicle may also comprise two members, wherein each member is configured to receive a module. The first member may comprise a removal protrusion for initiating a removal sequence for removing a module from a machine and the second member may comprise an installation protrusion for initiating an installation sequence for installing a module at the machine, wherein the removal protrusion and the installation protrusion are arranged such that each protrusion impinges on a different part of the machine in use. The autonomous vehicle may further comprise two pairs of members and the first pair of members may be arranged to receive a first module and comprises the first member and the second pair of members is arranged to receive a second module and comprises the second member. The first pair of members may further comprise a first latching means for removably retaining a module and the second pair of members may further comprise a first latching means for removably retaining a module. The latching means may comprise an actuated retention latch that, when actuated, retain a module between a pair of members. Continuing the above example, an autonomous vehicle may arrive at the industrial machine. Removing a faulty support module may comprise inserting the first pair of members into a portion of the industrial machine, such that each member of the pair of members is received either side of the support module. The removal protrusion may engage with, for example, a first switch on (or in) the industrial machine to signal the start of a support module removal sequence and the first latching means may engage with the support module. On completion of the removal sequence, the autonomous vehicle may move away from the industrial machine, thereby removing the support module from the industrial machine. In the case where the autonomous vehicle is also carrying a replacement support module, the autonomous vehicle may turn around and insert the second pair of members (and second support module) into a portion of the industrial machine. The installation protrusion may engage with, for example, a second switch on (or in) the industrial machine to signal the start of a support module installation sequence. On completion of the installation sequence, the latching means may disengage with the second support module and the autonomous vehicle may move away from the industrial machine, having installed the second support module. The industrial machine may resume operation (if it had previously stopped operation in response to the error message) and the autonomous vehicle may take the first support module (i.e. the faulty one) to the second designated area to be fixed. In other examples, instead of utilizing a protrusion, the autonomous vehicle and/or support module may comprise a QR code, RFID tag, barcode and/or machine-readable text which is read by a corresponding reader at the industrial machine. On recognition of (or position of) the autonomous vehicle and/or support module, a computing device at the industrial machine may initiate the removal and/or installation sequences.

In some examples, the autonomous vehicle is a robot. In some examples, the autonomous vehicle comprises one or more wheels. A pair of wheels may be mounted on a central axle. In some examples, the autonomous vehicle is battery powered and recharges at the third defined zone. In other examples, the autonomous vehicle is powered by induction, an internal combustions engine and/or or a compressed gas. The autonomous vehicle may comprise one or more propellers which enable it to travel through a fluid, such as the air or water. The autonomous vehicle may also be hardened against ionizing radiation. The autonomous vehicle may follow one or more pre-defined routes. The one or more pre-defined routes may be stored in a memory at the autonomous vehicle and/or may be transmitted from a server, via a network, the autonomous vehicle. In other examples, the autonomous vehicle may utilize a route-finding algorithm, which generates a route for each journey. In some examples, machine learning may be used to identify an optimum route.

Although the above describes a process in which a single autonomous vehicle removes a support module and replaces the removed support module with a second support module, it is also contemplated that two or more autonomous vehicles may carry out the same task. For example, a first autonomous vehicle may remove a first support module and a second autonomous vehicle may install a second support module.

FIGURES

The present disclosure is described in detail with reference to the following drawings, in which:

FIG. 1 illustrates a conventional machine arrangement.

FIG. 4 illustrates a schematic diagram of a support module for use in autonomously recovering a machine in accordance with some examples of the disclosure.

FIG. 7 illustrates an example flow chart for autonomously recovering a machine in accordance with some examples of the disclosure.

Figure 2:
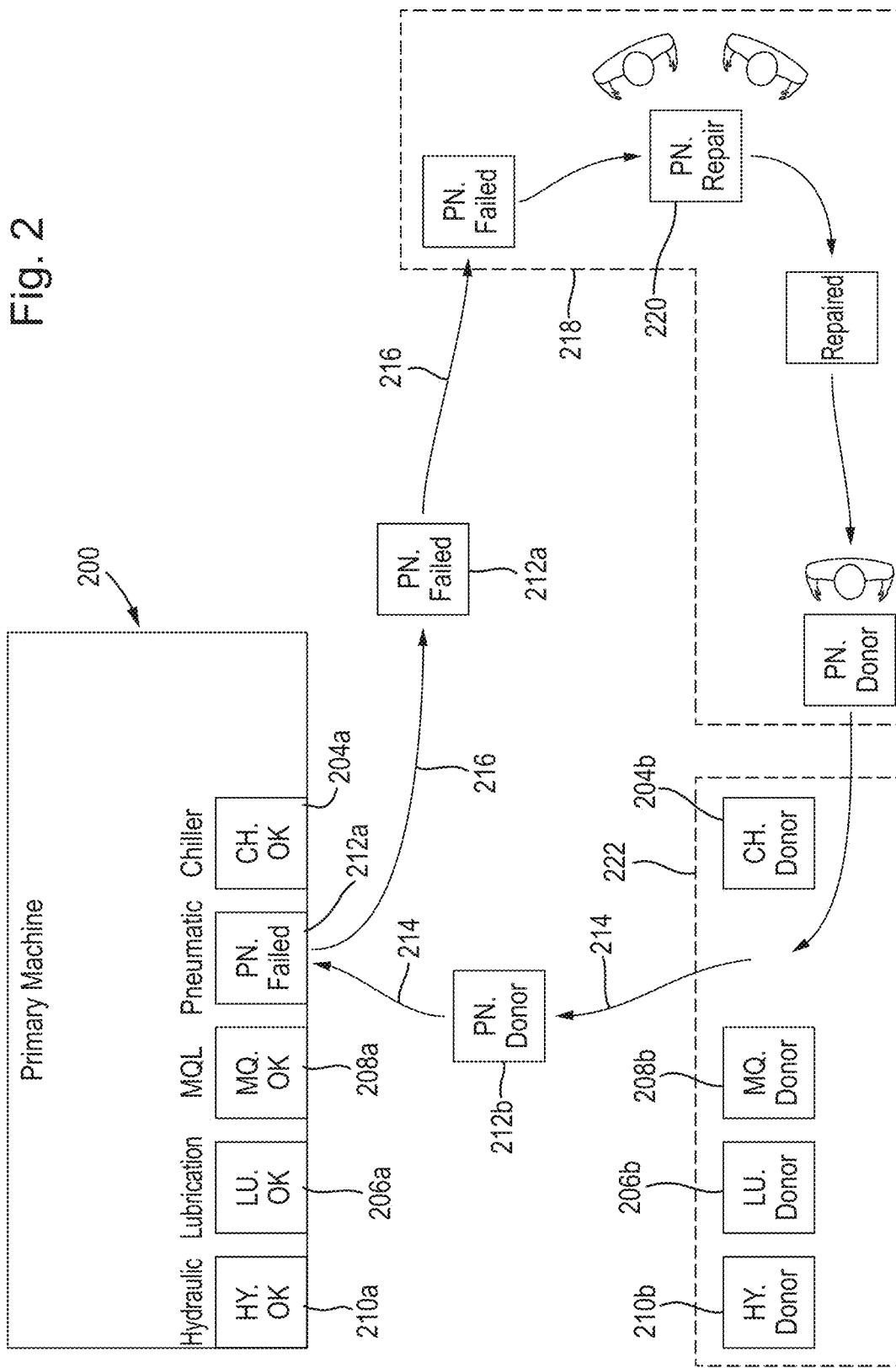
FIG. 2 illustrates a schematic diagram for autonomously recovering a machine in accordance with some examples of the disclosure.

The figures herein depict various examples of the disclosed disclosure for the purposes of illustration only. It shall be appreciated that additional or alternative structures, systems and method may be implemented within the principles set out by the present disclosure.

DETAILED DESCRIPTION

FIG. 1 shows a conventional machine 100 arrangement. The conventional machine comprises a service zone 102. The service zone 102 comprises a cooling chiller system 104, a centralized oiling system 106, a minimum quantity lubrication system 108 a hydraulic system 110 and a pneumatic system 112. Within the service zone 102, the systems are partially contained; however, they still need to be fixed and integrated within the framework of the conventional machine. If, for example, a component of one of the systems breaks then it is likely that the whole machine will need to be shut down until the fault is rectified. This may be to ensure the safety of a human technician fixing the machine and/or because the broken component is critical to the operation of the machine. Fixing the machine may include fault diagnosis, isolation lockout, identification of the broken part, enabling human access to the machine, locating and/or ordering a spare part, re-powering the machine and verifying that the part has been fixed. All of these steps may take a relatively long time to carry out, during which the machine may be inoperable.

FIG. 2 shows a schematic diagram for autonomously recovering a machine. In contrast to the conventional machine 100 shown in FIG. 1, the systems 204, 206, 208, 210, 212 of machine 200 are confined within an individual unit, or module. This enables the modules 204, 206, 208, 210, 212 to be removed, replaced and repaired and/or serviced at a location remote from the machine 200. An advantage of this is that it enables machine downtime to be reduced, as the machine only needs to be shutdown from the time a fault occurs (or is identified) to the time that the module 204, 206, 208, 210, 212 is replaced. In the event that a fault does not require the machine to be shutdown and the module is hot-swappable (i.e., that it can be replaced whilst the machine is still running) then there may be no machine downtime associated with a fault. In addition to replacing faulty modules, the recovery may comprise replacing a module so that a module can be serviced. For example, modules may be replaced in accordance with a service schedule and the removed module may be serviced before it is returned to the second defined area. Servicing may comprise, for example, topping up one or more fluids and/or replacing one or more parts of the module. The machine 200 comprises a chiller module 204a, a lubrication module 206a, a minimum quantity lubrication (MQL) module 208a, a hydraulic module 210a and a pneumatic module 212a. In some examples, the modules 204a, 206a, 208a, 210a and 212a are all located in the same area of the machine, so as to form a docking station. In this example, a fault has occurred at the pneumatic module 212a. In this example, an autonomous vehicle collects a replacement (or donor) pneumatic module 212b from a donor store (a first defined area) 222. The autonomous vehicle follows a first pre-defined route 214 from the donor store 222 to the machine 200. The autonomous vehicle removes the failed pneumatic module 212a and replaces it with the donor pneumatic module 212b. The autonomous vehicle follows a second pre-defined route 216 to the pit-stop repair bay (a second defined area) 218. At the pit-stop repair bay 218, the failed pneumatic module 212a is repaired 220. In this example, the failed module is repaired by human technicians, but in other examples the repair may be aided by one or more robots and/or may be carried out in an autonomous manner by one or more robots. The repaired pneumatic module is sent to the donor store 222, where it can be retrieved by an autonomous vehicle as needed. In this example, a human transfers the repaired module from the pit-stop repair bay 218 to the donor store 222; however, this transfer may also and/or alternatively be carried out by an autonomous vehicle.

Figure 3:
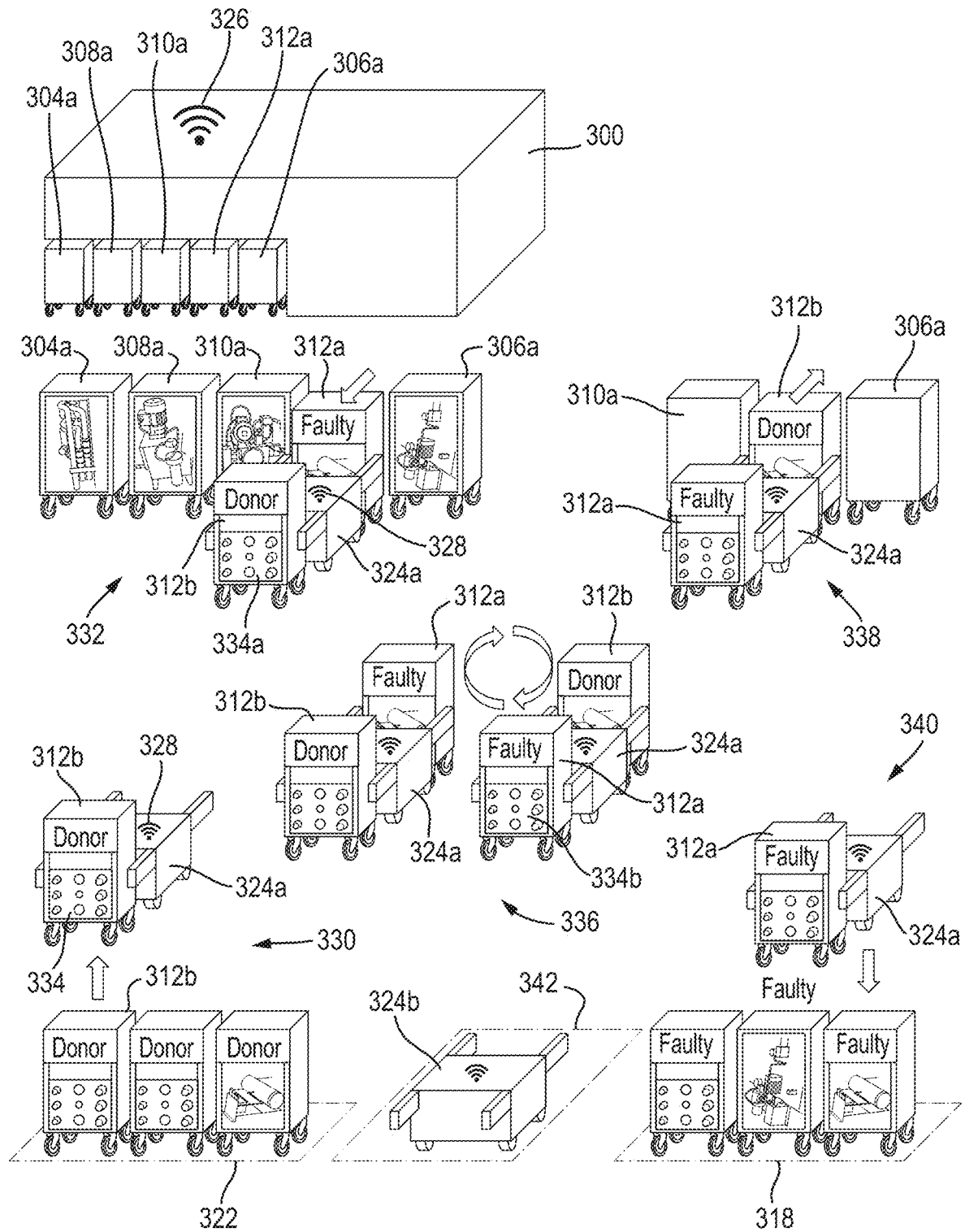
FIG. 3 illustrates another schematic diagram for autonomously recovering a machine in accordance with some examples of the disclosure.

FIG. 3 another schematic diagram for autonomously recovering a machine. In a similar manner to the system shown in FIG. 2, machine 300 comprises a chiller module 304a, a lubrication module 306a, a minimum quantity lubrication (MQL) module 308a, a hydraulic module 310a and a pneumatic module 312a. In some examples, the modules 304a, 306a, 308a, 310a and 312a are all located in the same area of the machine, so as to form a docking station. In this example, a fault has occurred at the pneumatic module 312a. On identification of the faulty module, in this case the pneumatic module 312a, instructions are transmitted from the machine 300 to an autonomous vehicle 324a via a Wi-Fi module 326 on the machine and a Wi-Fi module 328 on the autonomous vehicle 324a. On receiving the instructions, at 330 the autonomous vehicle 324a collects a replacement (or donor) pneumatic module 312b from the donor store (a first defined area) 322 by removably attaching itself to the replacement pneumatic module. The rear of the replacement pneumatic module 312b is facing away from the replacement pneumatic module and comprises one or more quick release couplings 334. Once the autonomous vehicle 324a has collected the replacement pneumatic module 312b from the donor store 322, it follows a pre-defined route and takes the replacement pneumatic module 312b to the machine 300. At 332, the autonomous vehicle 324a removes the faulty pneumatic module 312a from the machine 300. In this example, to remove the faulty pneumatic module, the autonomous vehicle 324a removably attaches itself to the faulty pneumatic module 312a and moves away from the machine 300. At 336, having removed the faulty pneumatic module 312a, the machine rotates so that the rear of the replacement pneumatic module 312b is facing the machine 300 and the rear of the faulty pneumatic module 312a is facing away from the machine 300. Once the rear of the replacement pneumatic module 312b is facing the machine 300, at 338, the autonomous vehicle 324a installs the replacement pneumatic module 312b by moving towards the machine 300 until the one or more quick release couplings 334 engage with corresponding couplings at the machine 300. Once the installation of the module is complete, the autonomous vehicle 324a detaches itself from the replacement pneumatic module 312b and moves away from the machine 300, along a pre-defined route, towards the pit-stop repair bay (a second defined area) 318. At 340, the autonomous vehicle 324a delivers the faulty pneumatic module 312a to the pit-stop repair bay 318. At this point, the autonomous vehicle 324a detaches itself from the faulty pneumatic module 312b and follows a predefined route to an autonomous vehicle bay (a third defined area) 342, where the autonomous vehicle 324a (or, in the case of a system with more than one autonomous vehicle, autonomous vehicle 324b) are stored when not in use.

FIG. 4 illustrates a schematic diagram of a support module 400 for use in autonomously recovering a machine. The support module 400 may be any of the aforementioned support modules, such as a chiller module, a lubrication module, a minimum quantity lubrication (MQL) module, a hydraulic module and/or a pneumatic module. In other examples, the module may comprise a laser and/or an ultrasonic welder. The support module 400 comprises four castors 402. In other examples, wheels may be used. In this example, the support module 400 comprises a recessed rear face 404, electrical connectors 406, one or more quick connectors (or quick release couplings) 408 and drip tray 410. The recessed face 404 may enable the module 400 to be more easily guided and received into a desired position in a machine. The module 400 may be received into a machine in a similar manner to a cassette. The quick connectors (or quick release couplings) 408 may be located underneath the electrical connectors 406 to avoid any liquids dripping and/or leaking on the electrical connectors 406. Example electrical connectors 406 include an electrical power feed and an electrical signal output/input. The quick connectors (or quick release couplings) 408 may be push/pull quick release connectors. The quick connectors (or quick release couplings) 408 may comprise connectors for oil, grease, water, coolant and/or compressed air depending on the module 400 functionality. The arrangement of the connectors may be unique for each individual module, or for a group of modules, such as an interchangeable type of module. Where the module comprises quick connectors (or quick release couplings), the female connector may be electrically actuated and may be located at the machine and the male connector may be located at the module 400. In another example, the electrically actuated female connector may be located at the module 400 and the male connector may be located at the machine. In some examples, the male connector may not be electrically actuated. Any removal and/or installation sequence may comprise actuating one or more of the female connectors. The unique arrangement of connectors may prevent an incorrect module from being inserted in an incorrect location. In addition, or instead of, a unique arrangement of connectors, the module may comprise a protrusion with a unique cross-section and/or shape. For example, a module of a first type may comprise a protrusion with a circular cross-section, a module of a second type may comprise a protrusion with a triangular cross-section and a module of a third type may comprise a protrusion with a square cross-section. The module may comprise one or more removable panels which cover the machinery contained within the module. The panels protect the machinery during normal use, but also enable easy access to the machinery when the machinery contained within the module is being repaired and/or serviced. After a module has been repaired and/or serviced, it may be plugged into a test rig in order to prove readiness and certify the module for active service in a machine.

A number of example modules follow. It will be appreciated that the connectors of certain modules may be applied to other modules and/or modules not explicitly named here. A cooling module may operate to perform a water circuit cooling function and may comprise electrical, cool water out and hot water return connectors. An MQL module may operate to perform a cooling function and may comprise electrical, mains air in, regulated air out and regulated oil out connectors. A hydraulics module may operate to perform an oil pressure feed function and may comprise electrical, cylinder #1 advance, cylinder #1 retract, cylinder #2 advance, cylinder #2 retract, cylinder #3 advance and cylinder #3 retract connectors. A pneumatics module may operate to perform an air pressure feed function and may comprise electrical, mains air in, cylinder #1 advance, cylinder #1 retract, cylinder #2 advance, cylinder #2 retract, cylinder #3 advance and cylinder #3 retract connectors. A lubrication module may operate to perform a lube loss system function and may comprise electrical and pressure out connectors. An air conditioning module may comprise an air chilling function and may comprise electrical, cool air duct and hot air duct connectors. An extraction module may comprise a suction filter function and may comprise electrical and vent duct connectors. A coolant module may comprise pumped circulation and may comprise electrical, coolant in and coolant pressure out connectors. A robot control module may comprise a signal program function and may comprise electrical connectors. A laser module may comprise an infra-red generation function and may comprise electrical, fiber optic cable, cool water in and hot water out connectors.

In order to disconnect a module from a machine, a dis-connection sequence may take place. For example, the dis-connection sequence may comprise the following steps: 1) computing device at machine identifies faulty system module; 2) computing device at machine identifies whether or not it is essential to pause the machine or whether the machine can continue to operate, for example in a limited manner. The identifying may comprise receiving additional data from probes within the machine and/or modules, internal gauging, re-synching and/or tool changes; 3) computing device at the machine communicates with a computing device at the autonomous vehicle; 4) the autonomous vehicle aligns with faulty module and advances to engage with the faulty module; 5) the autonomous vehicle fully engages with the faulty module and triggers the machine to de-activate the faulty module, de-energize the faulty module and open (or disengage) the quick connectors (or quick release couplings); and 6) the autonomous vehicle moves away from the machine, pulling the faulty module away from the machine. In order to re-connect a module to the machine, a re-connection sequence may take place. For example, the re-connection sequence may comprise the following steps: 1) the autonomous vehicle aligns the replacement module with a docking station of the machine; 2) the autonomous vehicle fully engages the replacement module and triggers a primary machine reconnection sequence which closes (or engages) the quick connectors (or quick release couplings), energizes the replacement module and triggers the replacement module to reactive; 3) the autonomous vehicle moves away from the machine, leaving the replacement module docked in the machine; 4) a computing device at the autonomous vehicle communicates with a computing device at the primary machine; 5) if the operation of the machine was paused, operation of the machine resumes.

Figure 5C:
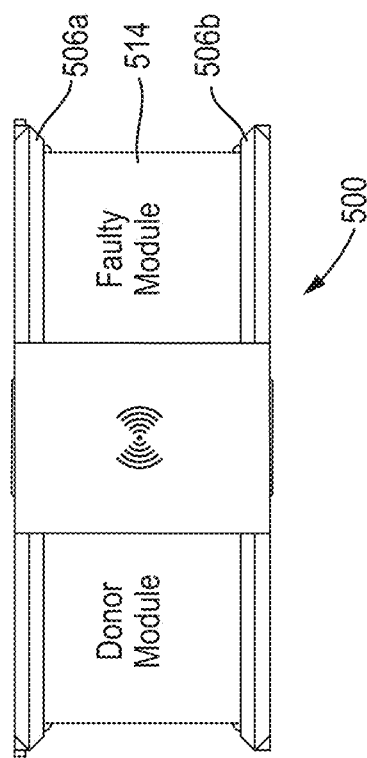
FIGS. 5A-5G illustrate a schematic diagram of an autonomous vehicle for use in autonomously recovering a machine in accordance with some examples of the disclosure.
Figure 5D:
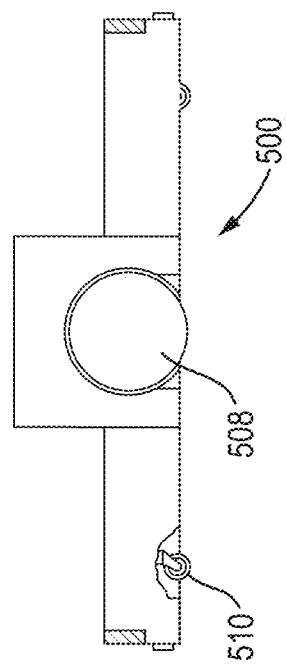
Figure 5A:
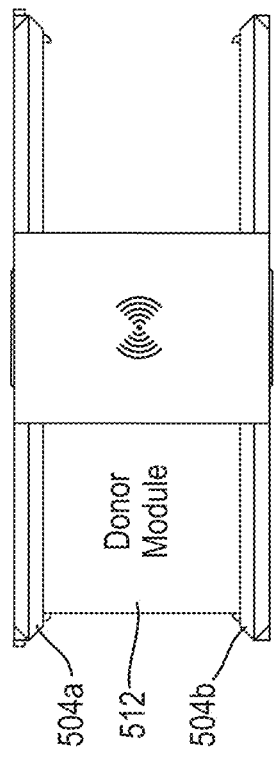
Figure 5B:
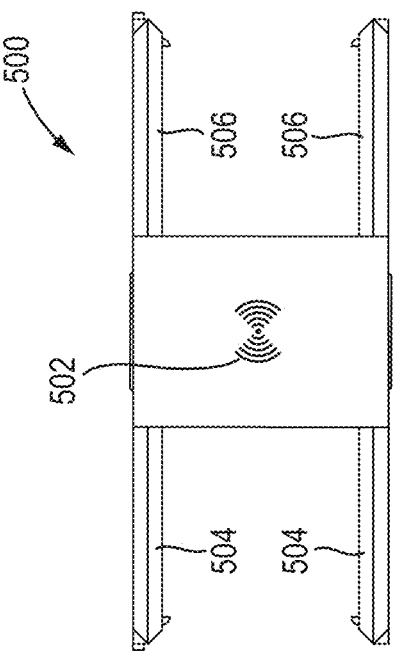
Figure 5E:
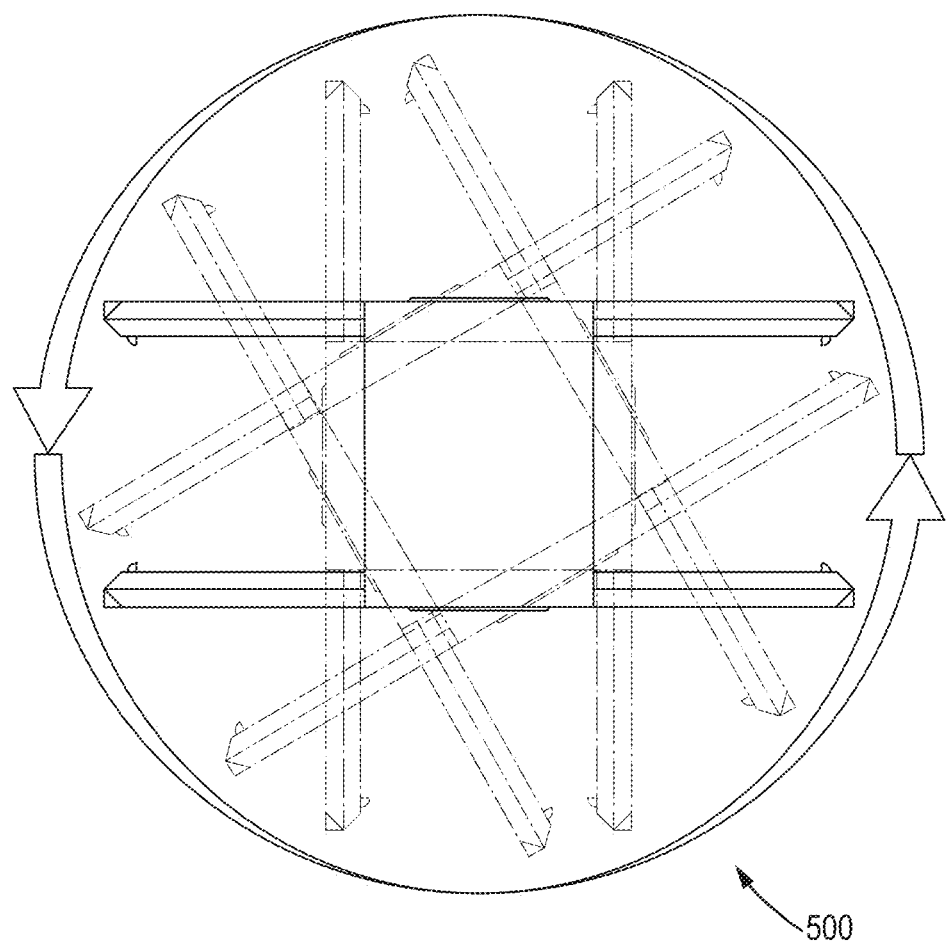
Figure 5G:
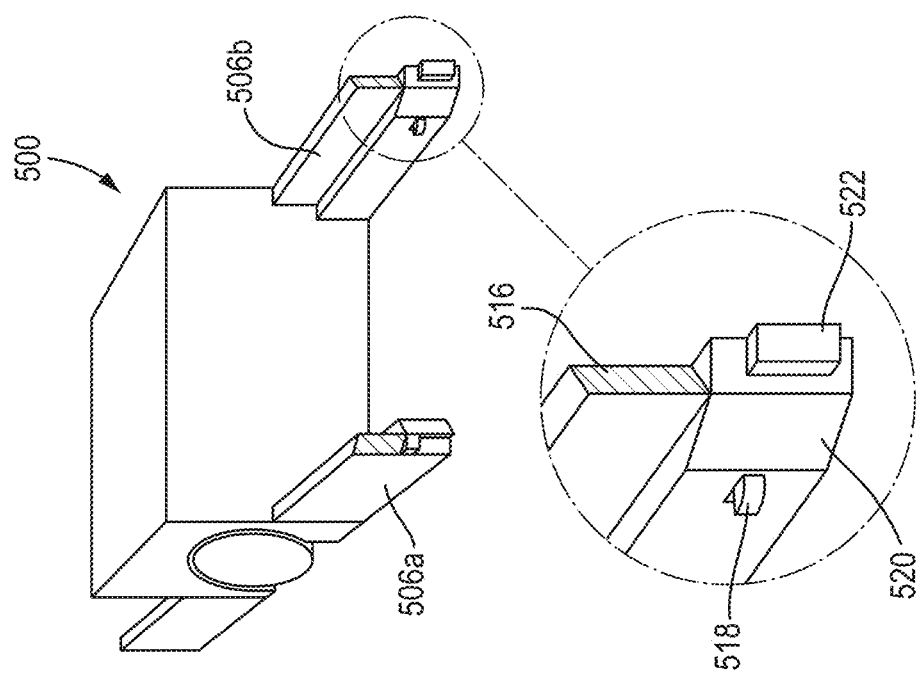
Figure 5F:
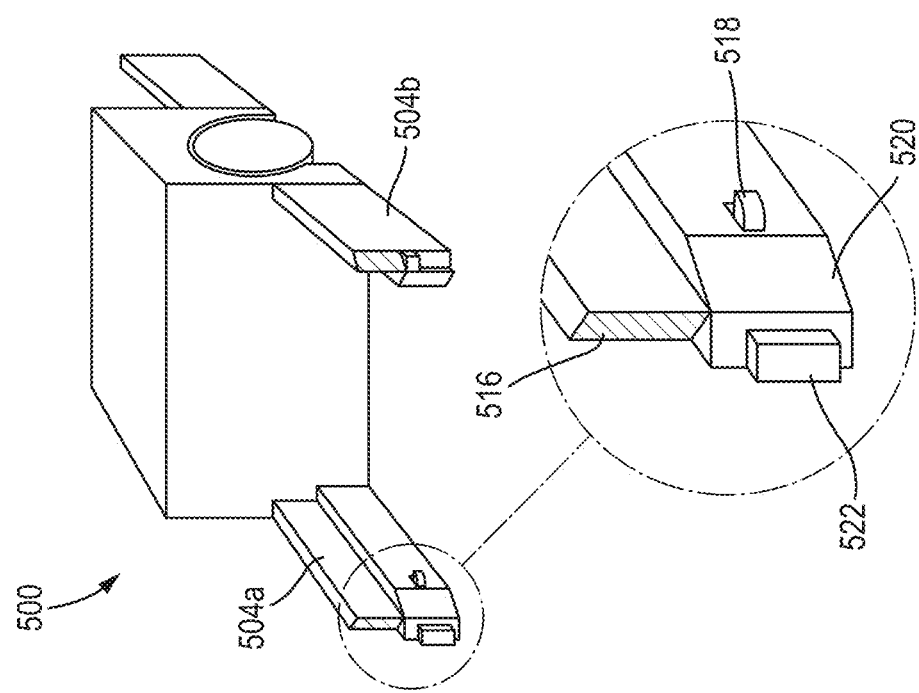

FIGS. 5A-5G illustrate a schematic diagram of an autonomous vehicle for use in autonomously recovering a machine. With reference to FIG. 5A, a plan view of autonomous vehicle 500 is shown. Autonomous vehicle 500 comprises a wireless transceiver, such as a Wi-Fi module 502, for wirelessly communicating with, for example, a PLC of a machine as discussed above. The autonomous vehicle 500 may also comprise a memory for storing sub-routines associated with one or more supply modules. The autonomous vehicle 500 comprises a first pair of arms (or members) 504 for receiving a replacement (or donor) module. The autonomous vehicle 500 also comprises a second pair of arms (or members) 506 for receiving a faulty module, or a module for servicing. With reference to FIG. 5B, a side view of autonomous vehicle 500 is shown. The autonomous vehicle 500 has a pair of centrally mounted, driven, wheels 508. Distal to the centrally mounted wheels 508 are four castors 510. The four castors 510 are located near an end of the arm away from the centrally mounted wheels 508. Such an arrangement allows the autonomous vehicle to pivot on a central axis and/or have a small turning circle. With respect to FIG. 5C, a plan view of the autonomous vehicle 500 is shown. FIG. 5C shows autonomous vehicle 500 carrying a replacement (or donor) module 512 between the first pair of arms 504a, 504b. With respect to FIG. 5D, a plan view of the autonomous vehicle 500 is shown. FIG. 5D shows autonomous vehicle 500 carrying a replacement (or donor) module 512 between the first pair of arms 504a, 504b and a faulty module (or module for servicing) 514 between the second pair of arms 506a, 506b. With respect to FIG. 5E, a plan view of the autonomous vehicle 500 is shown. FIG. 5E shows the autonomous vehicle 500 pivoting on a central axis, which is enabled by the arrangement of the wheels as described in connection with FIG. 5B. FIGS. 5F and 5G show an example arrangement that enables supply module disconnection and re-connection sequences to be triggered at a machine. All four arms 504a, 504b, 506a, 506b comprise a proximity sensor at their respective distal ends from the pair of centrally mounted wheels 508. At least one of the pair of arms 504, 506 comprises an actuated supply module retention latch 518 that, when actuated, retains a supply module between the pair of arms. The respective distal ends of the arms, from the pair of centrally mounted wheels 508, comprise a chamfered inner edge 520 to help guide a supply module in-between the pair of arms 504, 506. A first arm 504a of the first pair of arms 504 comprises a protrusion 522 at the distal end of the arm 504a, from the pair of centrally mounted wheels 508. In use, the protrusion 522 engages with a switch on (or in) a machine for engaging a re-connection sequence, for engaging the replacement supply module with the machine. A second arm 506b of the second pair of arms 506 comprises a protrusion 524 at the distal end of the arm 506b, from the pair of centrally mounted wheels 508. In use, the protrusion 524 engages with a switch on (or in) a machine for engaging a disconnection sequence, for removing a faulty supply module (or a module to be serviced) from the machine. The protrusions are arranged, such that when the first pair of arms 504 faces the machine, the protrusion is on the opposite arm to when the second pair of arms 506 faces the machine.

Although the autonomous vehicle 500 shown in FIGS. 5A-5G comprises two pairs of arms, other arrangements are contemplated. For example, an autonomous vehicle may carry only a single module. In other examples, an autonomous vehicle may comprise one or more additional pairs of arms, such that an autonomous vehicle may be able to carry more than two supply modules. For example, an autonomous vehicle may be able to carry two pairs (i.e., four in total, for example, two replacement supply modules and two faulty/to be serviced supply modules) of supply modules at a time. In such an arrangement, additional driven wheels may be required in order to allow the autonomous vehicle to move backwards and forwards with respect to each pair of supply modules. In other arrangements, a single arm may be used to engage with a supply module. For example, a single arm may fit in a gap between the bottom of a supply module and the floor and the arm may engage with the underside of the supply module.

Figure 6:
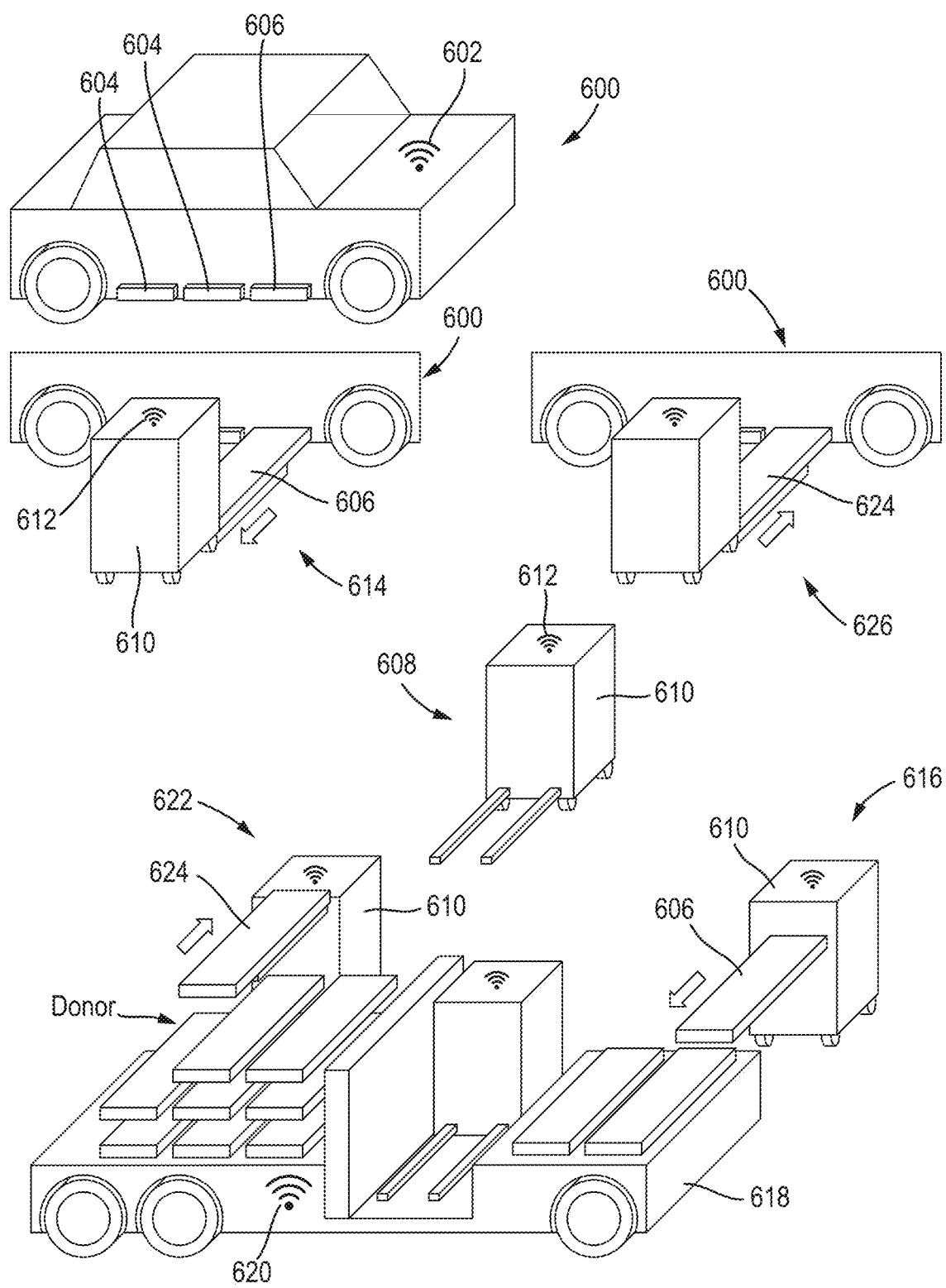
FIG. 6 illustrates a schematic diagram of an autonomous vehicle for use in autonomously recovering a machine in accordance with some examples of the disclosure.

FIG. 6 illustrates a schematic diagram of an autonomous vehicle for use in autonomously recovering a machine. In this example, the machine is an electric vehicle 600. The electric vehicle comprises a wireless transceiver 602, such as Wi-Fi module 602, charged batteries 604 and a faulty battery 606. Although the vehicle 600 in this example comprises more than one battery, the same system may be used with a vehicle comprising a single battery. Additionally, instead of a faulty battery, the autonomous robot may remove a battery that is at least partially discharged and replace it with a battery that is at least substantially charged, for example the autonomous robot may remove a battery with 20% charge remaining and replace it with a battery with 80% charge remaining. Typically, the vehicle 600 would be driven to a battery exchange station in response to a message generated at the vehicle 600. At 608, the vehicle 600 communicates with autonomous robot 602 via the vehicle 600 Wi-Fi module 602 and the autonomous robot 602 Wi-Fi module 612. The communication between the vehicle 600 and the autonomous robot 608 comprises identifying the faulty battery 606. The autonomous robot 602 moves towards the vehicle 600, following at least a partially pre-defined route. At the vehicle 600, the autonomous robot 602 may use programmed routines and input from one or more sensors in order to move from an end point of a pre-defined route to the vehicle 600. At 614, the autonomous robot 602 extracts the identified faulty battery 606. Once the autonomous robot 610 has extracted the faulty battery the autonomous robot 610 follows a route that is at least partially defined to an exchange area. In this example, the exchange area is a mobile platform 618 that comprises separate sections for receiving faulty batteries, receiving and charging autonomous robots and storing healthy (i.e., not faulty and/or at least substantially charged batteries) batteries. At 616, the autonomous robot 610 delivers the faulty battery 606 to the mobile platform 618. The autonomous robot 610 moves to a second section of the mobile platform 618 and at 622 the autonomous robot 610 collects a healthy battery from the mobile platform. The autonomous robot 610 travels along a route that is at least partially pre-defined and installs the healthy battery in the vehicle 600. Although the example here shows an autonomous robot comprising a single pair of arms, an autonomous robot comprising two pairs of arms may also be utilized in a manner similar to that described above, such that the autonomous robot carries a healthy battery and a faulty battery at the same time.

FIG. 7 illustrates an example flow chart for autonomously recovering a machine. Process 700 may utilize any of the aforementioned components 200, 204, 206, 208, 210, 212, 300, 304, 306, 308, 310, 312, 324, 400, 500, 512, 514, 600, 606, 610, 624. At 702 a status message is received at a first computing device at a machine, for example machine 200, 300, 600. At 704, based on the status message, a first module of one or more modules of the machine is determined to replace, wherein the module has a first type, for example one of the modules 204, 206, 208, 210, 212, 304, 306, 308, 310, 312, 400, 606, 624. At 706, a second module of the first type is collected with an autonomous vehicle and from a first defined area, for example with autonomous vehicle 324, 500, 610. At 708, the autonomous vehicle is instructed to remove, from the machine, the first module. At 710, the first autonomous vehicle is instructed to install, at the machine, the second module. At 712, the autonomous vehicle delivers the first module to a second defined area. At 714, the first module is repaired. At 716, the first module is transferred from the second defined area to the first defined area.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

The invention claimed is:

1. A method of autonomously recovering a machine comprising one or more modules, the method comprising:
   receiving a status message at a first computing device at the machine;
   determining, based on the status message, a first module of the one or more modules to replace, wherein the first module has a first type;
   instructing a first autonomous vehicle to remove, from the machine, the first module;
   instructing the first autonomous vehicle to install, at the machine, a second module of the first type;
   instructing the first autonomous vehicle to deliver the first module to a first defined area;
   repairing the first module at the first defined area; and
   instructing the first autonomous vehicle to deliver the repaired first module to a second defined area.

2. The method of claim 1, wherein the first autonomous vehicle collects the second module from a third defined area before removing the first module.

3. The method of claim 1, wherein the machine is an industrial machine.

4. The method of claim 1, wherein the first module comprises at least one of: a pneumatic system, a hydraulic system, an electrical system, a mechanical system, a cooling system, a lubrication system and/or a laser system.

5. The method of claim 1, wherein the status message comprises a fault code and the determining the first module to replace is based on the fault code.

6. The method of claim 1, wherein the first autonomous vehicle is an automatic guided vehicle.

7. The method of claim 1, wherein the first autonomous vehicle follows a predefined route.

8. The method of claim 1, wherein the at least one of the one or more modules comprises one or more quick release couplings.

9. The method of claim 1, wherein first computing device comprises a programmable logic controller.

10. The method of claim 1, wherein the machine is one of a plurality of machines and at least one of the one or more modules is installable at two or more of the plurality of machines.

11. The method of claim 1, wherein:
    the first computing device communicates the error message to a plurality of autonomous vehicles; and
    the plurality of autonomous vehicles communicate in a peer-to-peer manner to identify one of the plurality of autonomous vehicles as the first autonomous vehicle.

12. The method of claim 1, wherein:
    the first computing device transmits the error message to a second computing device;
    the second computing device identifies one of a plurality of autonomous vehicles as the first autonomous vehicle; and
    the second computing device transmits the instructions to the first autonomous vehicle that cause the first autonomous vehicle to remove the first module and install the second module.

13. The method of claim 1, wherein the machine is an electric car and the first module is a battery.

14. An autonomous vehicle for use with method of claim 1, the autonomous vehicle comprising:
    a wireless transceiver;
    a memory for storing computer readable instructions;
    two members, wherein each member is configured to receive a module;
    wherein the first member comprises a removal protrusion for initiating a removal sequence for removing a module from a machine; and
    wherein the second member comprises an installation protrusion for initiating an installation sequence for installing a module at the machine, wherein the removal protrusion and the installation protrusion are arranged such that each protrusion impinges on a different part of the machine in use.

15. The autonomous vehicle of claim 14, wherein the autonomous vehicle further comprises two pairs of members and wherein:
    the first pair of members is arranged to receive a first module and comprises the first member; and
    the second pair of members is arranged to receive a second module and comprises the second member.

16. The autonomous vehicle of claim 15, wherein:
    the first pair of members further comprises a first latching means for removably retaining a module; and
    the second pair of members further comprises a first latching means for removably retaining a module.

17. The autonomous vehicle of claim 14 further comprising a pair of wheels on centrally mounted axle.

18. The autonomous vehicle of claim 14 further comprising one or more propellers.

* * * * *